July 8, 1941.     H. G. OCH     2,248,776
WAVE FILTER
Filed July 28, 1938     4 Sheets-Sheet 1

INVENTOR
H. G. OCH
BY
Ralph T. Holcomb
ATTORNEY

July 8, 1941.  H. G. OCH  2,248,776

WAVE FILTER

Filed July 28, 1938  4 Sheets-Sheet 2

INVENTOR
H. G. OCH
BY
Ralph T. Holcomb
ATTORNEY

July 8, 1941.  H. G. OCH  2,248,776
WAVE FILTER
Filed July 28, 1938  4 Sheets-Sheet 3

INVENTOR
H. G. OCH
BY
Ralph P. Holcomb
ATTORNEY

July 8, 1941.  H. G. OCH  2,248,776
WAVE FILTER
Filed July 28, 1938   4 Sheets-Sheet 4

INVENTOR
H. G. OCH
BY
Ralph T. Holcomb
ATTORNEY

Patented July 8, 1941

2,248,776

UNITED STATES PATENT OFFICE 2,248,776

WAVE FILTER

Henry G. Och, West Englewood, N. J., assignor to Bell Telephone Laboratories, Incorporated, New York, N. Y., a corporation of New York Application July 28, 1938, Serial No. 221,721

20 Claims. (Cl. 178—44)

This invention relates to selective wave transmission networks which use piezoelectric crystals as impedance elements and more particularly to unbalanced wave filters of the bridged-T type.

The principal object of the invention is to reduce the number of component elements required in unbalanced wave filters.

A feature of the invention is a filter of the bridged-T type in which the series arms of the T are constituted by a single piezoelectric crystal with divided electrodes.

It has been known heretofore how to construct bridged-T wave filters employing piezoelectric crystals in the bridging branch and in the shunt branch, but in these filters the series arms of the T have consisted of a pair of reactance elements such as inductors or capacitors. In accordance with the present invention the series arms of the T are constituted by a single crystal element having a split electrode on one or both sides. The shunt branch of the T and the bridging branch may comprise inductors or capacitors, or a combination of these, and may include one or more additional crystals. Capacitors may be connected in shunt at the ends of the crystal. The component elements may be arranged and proportioned to provide wave filters of the low-pass, high-pass, band-pass or band-elimination type.

The nature of the invention will be more fully understood from the following detailed description and by reference to the accompanying drawings, of which:

Figure 4:
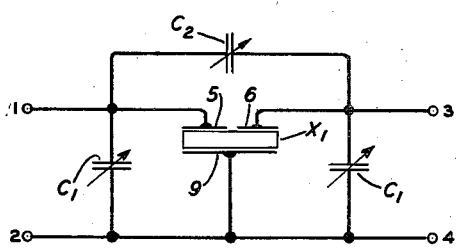
Fig. 4 shows a band-pass filter in accordance with the invention.
Figure 8:
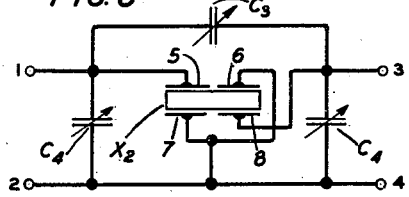
Fig. 8 shows the reversed poling for the connections to the electrodes of the crystal in the circuit of Fig. 4.
Figure 9:
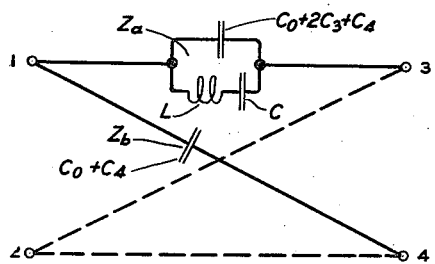
Figure 10:
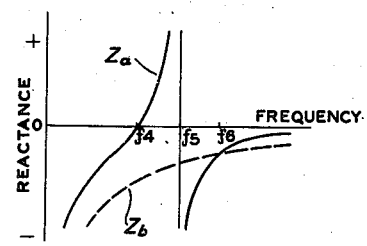
Figure 12:
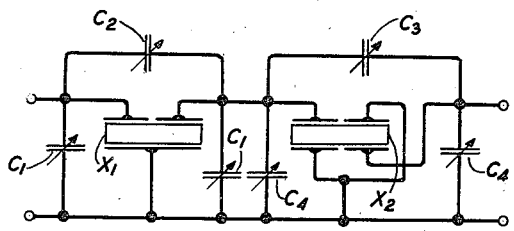
Figure 11:
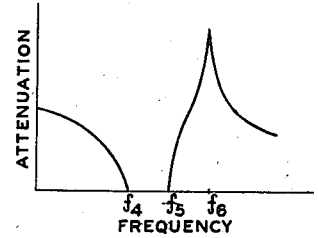
Figure 13:
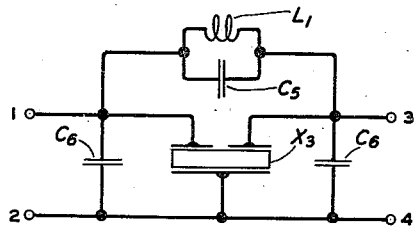
Figure 14:
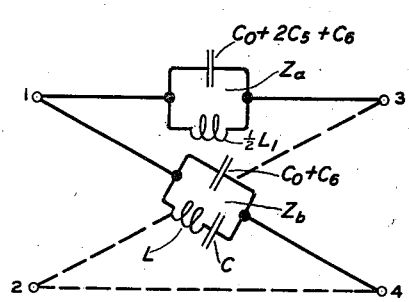
Figure 15:
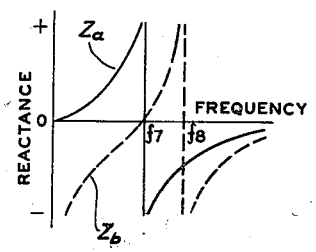
Figure 16:
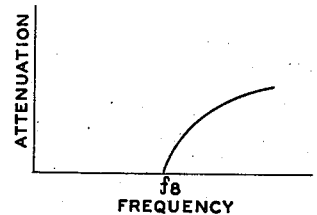
Figure 17:
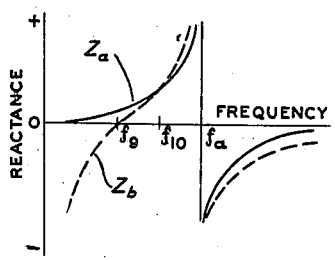
Figure 18:
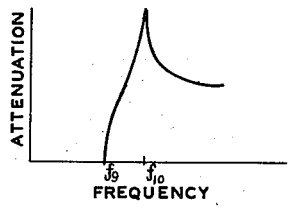
Figure 19:
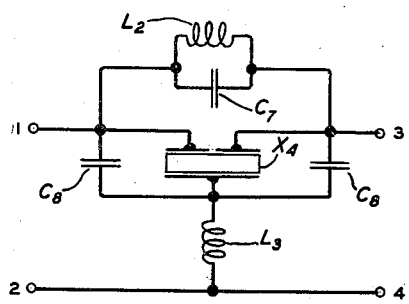
Figure 20:
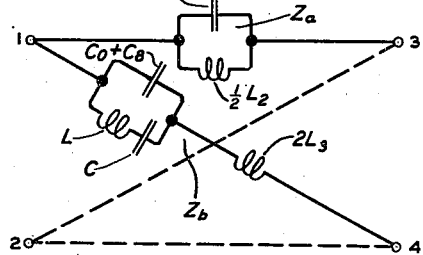
Figure 21:
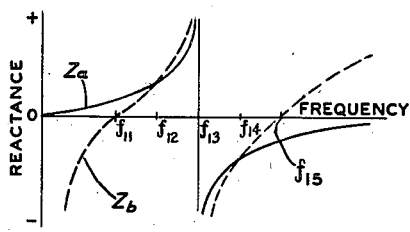
Figure 22:
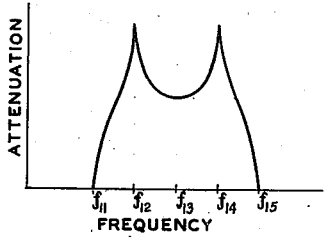
Figure 23:
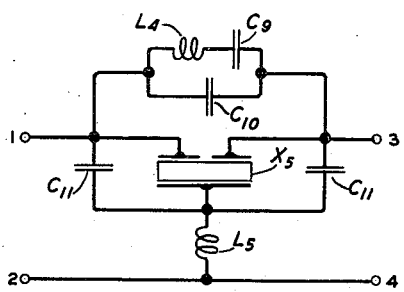
Figure 24:
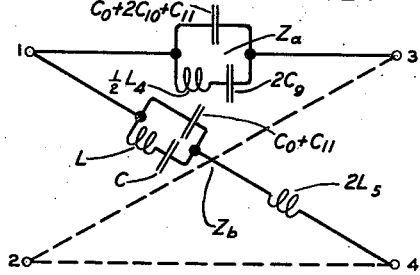
Figure 25:
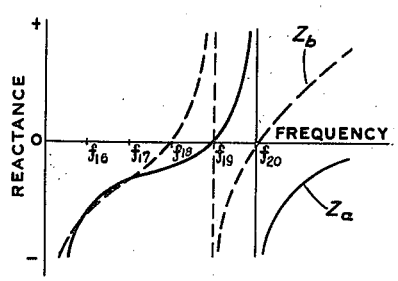
Figure 26:
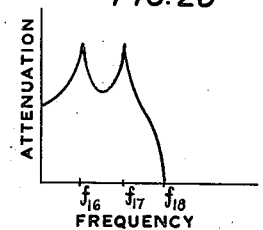
Figure 27:
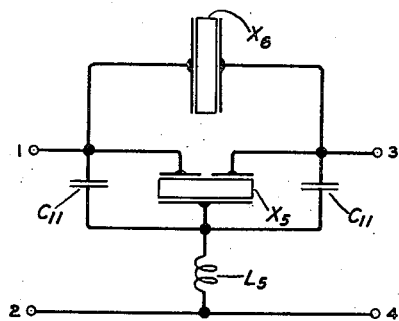
Figure 28:
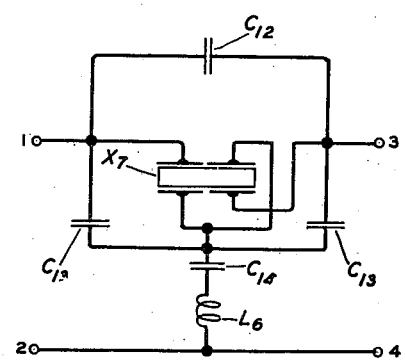

Figs. 9, 10, and 11 show respectively the equivalent lattice, the reactance characteristics for the branches and a typical attenuation characteristic for the filter of Fig. 8;

Fig. 12 is a composite network comprising the filters of Figs. 4 and 8 connected in tandem;

Fig. 13 shows the invention embodied in a low-pass filter;

Fig. 14 is an equivalent lattice for the filter of Fig. 13;

Figs. 15 and 16 show respectively the reactance characteristics of the impedance branches and the attenuation characteristic for one distribution of the critical frequencies in the equivalent lattice of Fig. 14;

Figs. 17 and 18 show respectively the reactance characteristics of the branches and a typical attenuation characteristic for another distribution of the critical frequencies in the lattice of Fig. 14;

Fig. 19 is a band-elimination filter in accordance with the invention;

Figs. 20, 21 and 22 show respectively the equivalent lattice, the reactance characteristics of the impedance branches and a typical attenuation characteristic for the filter of Fig. 19;

Fig. 23 is a high-pass filter in accordance with the invention;

Figs. 24, 25 and 26 show respectively the equivalent lattice, the reactance characteristics of the impedance branches and the attenuation characteristic for the filter of Fig. 23;

Fig. 27 shows an alternative structure for the filter of Fig. 23 in which the bridging branch includes a piezoelectric crystal element;

Fig. 28 shows another alternative circuit for the high-pass filter; and

Figure 29:
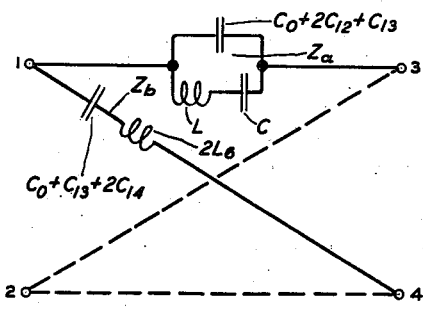
Figure 30:
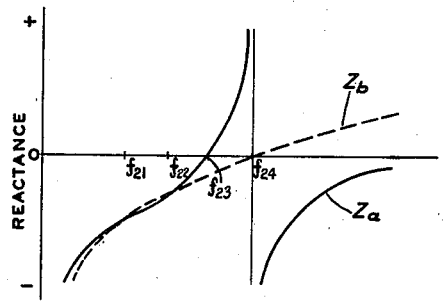

Figs. 29 and 30 show respectively the equivalent lattice and the reactance characteristics of the branches for the filter of Fig. 28.

Figure 1:
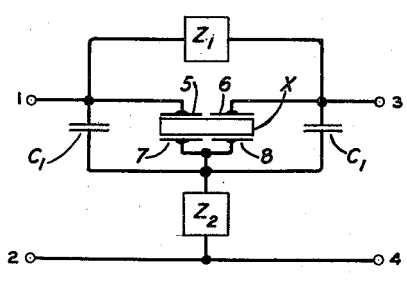
Fig. 1 shows the general configuration of the network of the invention.

Fig. 1 is a general schematic diagram of the circuit arrangement of the filters of the invention, which are of the bridged-T type. The series arms of the T are constituted by a piezoelectric crystal X having four electrodes, two of which are connected to one terminal of the shunt impedance branch $Z_2$ and the remaining two of which are connected, respectively, to an input terminal 1 and the corresponding output terminal 3. The bridging branch of the network is constituted by the impedance $Z_1$. Two equal capacitors $C_1$, $C_1$, designated by their capacitances, are connected in shunt at the ends of the crystal. The impedances $Z_1$ and $Z_2$ may be of any degree of complexity and may comprise inductors, capacitors and additional crystals. Suitable load impedances may be connected to the input terminals 1, 2 and the output terminals 3, 4. The figure shows the unbalanced form of the network in which the path between terminals 2 and 4 may be grounded or otherwise fixed in potential. The filter may, of course, be built in the balanced form.

The crystal X is preferably of quartz in the form of a relatively narrow rectangular plate cut perpendicular to the electrical axis of the crystal and with its length in the direction of the mechanical axis. Such a crystal will vibrate longitudinally when alternating potentials are applied to electrodes placed on the larger surfaces. Other well-known types of crystal cut may be used and, under certain conditions, they may be preferred. The crystal shown in Fig. 1 is of the rectangular type described above but for convenience is shown in end elevation.

Figure 2:
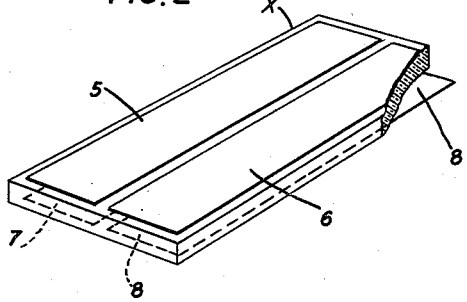
Fig. 2 is a perspective view of the piezoelectric crystal element showing how the electrodes are placed.

As shown in more detail in the perspective view of Fig. 2, the crystal X is provided with two electrodes 5, 6 on one of the major faces and two oppositely disposed electrodes 7, 8 on the opposite face. These electrodes may be of silver, aluminum or other suitable metal, plated directly onto the crystal, and may be applied by plating the two surfaces all over and afterwards removing a narrow longitudinal strip of the plating along the center of each face. It is generally desirable also to remove narrow strips of the plating around the edges of the crystal. When the crystal vibrates in the longitudinal mode, it is preferably supported between two or more oppositely disposed points or knife-edge clamps located near the center of the crystal along the optical axis. Connections to the electrodes may be made through these clamps or by attaching leads directly to the electrodes with soft solder.

Figure 3:
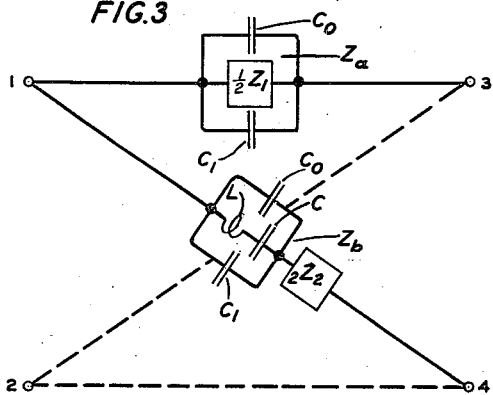
Fig. 3 is an equivalent lattice circuit for the network of Fig. 1.

Since the network of Fig. 1 is symmetrical with respect to its input terminals 1, 2 and its output terminals 3, 4 its properties may be investigated most conveniently from a consideration of the symmetrical lattice network to which it is equivalent. The line branch of the equivalent lattice is equal to half of the impedance measured between terminals 1 and 3 of Fig. 1, and the diagonal branch is equal to twice the impedance measured between terminals 1 and 3 strapped together and terminal 2 or 4. It is apparent that the mechanical vibration of the crystal occurs for only one of these measurements, depending upon the poling of the crystal electrodes. Therefore, the impedance representing the piezoelectric properties of the crystal will appear in only one of the branches of the lattice. The electrode capacitance of the crystal, however, will appear in the other branch. Fig. 3 shows the equivalent lattice for the poling shown in Fig. 1, where the interconnected electrodes are on the same side of the crystal. For this case the crystal impedance appears in the diagonal branch. The equivalent lattice comprises two similar line impedance branches $Z_a$ each consisting of the electrode capacitance $C_0$, an impedance $$\tfrac{1}{2}Z_1$$

and the capacitance $C_1$, all connected in parallel, and two similar diagonal impedance branches $Z_b$ each made up of an impedance $2Z_2$ in series with the crystal impedance, the latter being shunted by the capacitance $C_1$. For the sake of clarity, in this and in subsequent figures only one line branch and one diagonal branch are shown in detail, the other corresponding line and diagonal branches being indicated by dotted lines connecting the appropriate terminals.

In Fig. 3 the crystal impedance is represented by its equivalent circuit comprising the capacitance $C_0$ shunted by a branch consisting of an inductance L in series with a second capacitance C. The capacitance $C_0$ represents the simple electrostatic capacitance between a pair of oppositely disposed electrodes, such as 5 and 7. The values of the capacitance C and the inductance L depend upon the dimensions of the crystal and also upon its piezoelectric and elastic constants. The values of the elements in the equivalent circuit for the crystal, in terms of the dimensions of the crystal X, may be determined from the following formulas, assuming that the electrodes cover substantially the entire area of the two major faces of the crystal.

$$L=\frac{212.2lt}{w} \text{ henries} \qquad (1)$$

$$C=\frac{0.161wl}{t10^{14}} \text{ farads} \qquad (2)$$

$$C_0=\frac{20.1wl}{t10^{14}} \text{ farads} \qquad (3)$$

in which $l$, $w$ and $t$ are, respectively, the length, width and thickness of the crystal measured in centimeters. The remaining impedances in the lattice are the same as the corresponding ones in the bridged-T, multiplied by the numerical factors as indicated.

If reversed poling is used in Fig. 1, that is, if the connections to a pair of oppositely disposed electrodes, for example electrodes 6 and 8, are interchanged, the impedance representing the piezoelectric properties of the crystal will appear in the line impedance branch instead of in the diagonal branch of the equivalent lattice. This means that in Fig. 3 the arm consisting of the capacitance C and the inductance L will be removed from the diagonal branch $Z_b$ and placed in parallel with the electrode capacitance $C_0$ in the line branch $Z_a$. The other component elements of the lattice will remain unchanged.

The image impedance K of the lattice network of Fig. 3 is given by the expression $$K=\sqrt{Z_a Z_b} \qquad (4)$$

and the propagation constant P may be found from the expression $$\tanh \frac{P}{2}=\sqrt{\frac{Z_a}{Z_b}} \qquad (5)$$

The filter will have transmission bands in the regions where $Z_a$ and $Z_b$ are of opposite sign and will have attenuation bands where $Z_a$ and $Z_b$ are of the same sign, with peaks of attenuation occurring at the frequencies where $Z_a$ and $Z_b$ are equal. By virtue of the equivalence pointed out above, these expressions also give the impedance and propagation constant of the bridged-T network of Fig. 1. The values of the various circuit elements of the lattice, including the electrical elements equivalent to the crystal, can be found from the resonant and anti-resonant frequencies of the $Z_a$ and $Z_b$ branches by a direct application of R. M. Foster's reactance theorem given in the Bell System Technical Journal, vol. III, No. 2, April 1924, pages 259 to 267. The values of the component elements in the bridged-T network of Fig. 1 are found by applying the numerical factors indicated. By a proper choice of component elements any one of a variety of filter characteristics may be obtained. Some specific examples in accordance with the invention will next be considered.

Fig. 4 is a schematic diagram showing a bandpass filter. The series arms of the T are provided by the crystal $X_1$ which has the capacitors $C_1$, $C_1$ shunting its ends. The capacitor $C_2$ forms the bridging branch, and no additional shunt impedance is required. The poling shown in Fig. 1 is used for the connections to the electrodes of the crystal and since the two electrodes 7 and 8 on one side of the crystal are connected together they may be replaced by a single electrode 9 as shown.

Figure 6:
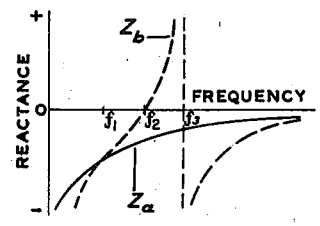
Fig. 6 represents the reactance characteristics of the line and diagonal branches of the lattice of Fig. 5.
Figure 5:
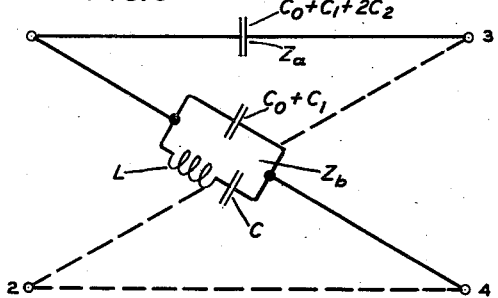
Fig. 5 is an equivalent lattice for the filter of Fig. 4.
Figure 7:
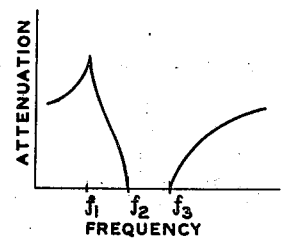
Fig. 7 is a typical attenuation characteristic for the filter of Fig. 4.

The equivalent lattice, following Fig. 3, is given in Fig. 5. The line impedance branch is a capacitance equal to the sum of $C_0$, $C_1$ and $2C_2$, and the diagonal branch is made up of a capacitance equal to $C_0$ plus $C_1$ shunted by an arm representing the piezoelectric properties of the crystal and consisting of the inductance L in series with the capacitance C. Fig. 6 represents the reactance-frequency characteristics of the line and diagonal branches of the lattice of Fig. 5. The reactance of the line branch $Z_a$ is that of a simple capacitance and is given by the solid-line curve. The reactance of the diagonal branch $Z_b$, shown by the dotted-line curve, exhibits a resonance at the frequency $f_2$ and an anti-resonance at the frequency $f_3$. The transmission band extends from $f_2$ to $f_3$ because in this region the reactances $Z_a$ and $Z_b$ are of opposite sign. At all other frequencies the filter will attenuate, since the reactances are of the same sign. At some frequency $f_1$, on the lower side of the transmission band, the two curves cross, and a peak of attenuation will occur here. A typical attenuation characteristic is shown symbolically in Fig. 7.

The magnitude of the capacitance $C_1$ shunting each end of the crystal does not affect the frequency of resonance $f_2$ but it does determine the location of the anti-resonance frequency $f_3$. Since the width of the transmission band is determined by the separation of these two frequencies the band width of the filter can therefore be adjusted by varying the value of this capacitance. As indicated by the arrows in Fig. 4, the capacitors $C_1$, $C_1$ may be made variable for this purpose. The widest band is obtained when these capacitances are zero, that is, when they are omitted from the circuit. As these capacitances are increased in value, the width of the band is decreased, and a band as narrow as desired may be obtained.

The capacitance $C_2$ has its greatest effect on the location of the crossing point of the two reactance characteristics. Since the location of this point determines the placing of the peak of attenuation, the peak may be adjusted by varying the magnitude of this capacitance. As indicated, the capacitor $C_2$ may be made variable to adjust the location of the peak. If $C_2$ is omitted the peak is relegated to zero frequency and as the value of $C_2$ is increased the peak is made to approach the lower cut-off frequency $f_2$.

In order to place the peak of attenuation on the upper side of the transmission band, instead of on the lower side, it is only necessary to reverse the poling of the connections to the crystal, as shown by the circuit of Fig. 8. Here the diagonally opposite electrodes 6 and 7 of the crystal $X_2$ are connected together and to the path between terminals 2 and 4 of the network. The remaining electrodes 5 and 8 are connected, respectively, to the terminals 1 and 3. The capacitors $C_4$, $C_4$ are connected in shunt at the ends of the crystal, and the capacitor $C_3$ forms the bridging branch.

For this connection the line branch of the equivalent lattice, as shown in Fig. 9, comprises a capacitance equal to the sum of $C_0$, $2C_3$ and $C_4$ shunted by an arm consisting of the inductance L in series with the capacitance C, and the diagonal branch is constituted by a capacitance equal to $C_0$ plus $C_4$. The reactance characteristics of the line branch $Z_a$ and the diagonal branch $Z_b$ are given, respectively, by the solid-line curve and the dotted-line curve of Fig. 10. The attenuation characteristic, as shown in Fig. 11, has a transmission band extending from $f_4$ to $f_5$ in the region where the branch $Z_a$ has a positive reactance, and an attenuation peak at the frequency $f_6$, on the upper side of the pass band, where the curves cross. The capacitor $C_3$ may be made variable to adjust the location of the attenuation peak and the end capacitors $C_4$, $C_4$ may be made variable to adjust the width of the transmission band.

An attenuation characteristic having a peak on each side of the transmission band can be obtained by connecting in tandem the filter of Fig. 4 and the filter of Fig. 8. The filters should have matching image impedances and the same transmission band. Such a composite filter is shown in Fig. 12. The two capacitors $C_1$ and $C_4$ connected in parallel at the junction of the two sections may, of course, be replaced by a single capacitance equal to the sum of the two.

It will be noted that the band-pass filters shown in Figs. 4 and 8 require a minimum number of component reactance elements. If the full band width is used, so that the end capacitors may be omitted, each filter requires only a single crystal and one capacitor. No inductors are required in the design. The other filters described hereinafter are also very economical in their use of elements.

The network of Fig. 4 can be converted into a low-pass filter by the addition of an inductance in the bridging branch, as shown in Fig. 13. The series arms of the T are provided by the crystal $X_3$, which is shunted at its ends by the capacitors $C_5$ and $C_5$. The bridging branch consists of the inductance $L_1$ and a capacitance $C_6$ connected in parallel. The equivalent lattice is given in Fig. 14 and the reactance characteristics of the line and diagonal branches are given in Fig. 15. The line branch is a simple anti-resonant circuit and the diagonal branch has a resonance and an anti-resonance. If the anti-resonance of the line branch is made to coincide with the resonance of the diagonal branch, at the frequency $f_7$, the filter will freely transmit all frequencies lying below $f_8$, the anti-resonance frequency of the diagonal branch. The attenuation characteristic for this distribution of the critical frequencies will be as shown symbolically in Fig. 16. An attenuation peak may be introduced by making the two anti-resonances coincide, at the frequency $f_a$, as shown by the reactance characteristics of Fig. 17. The cut-off will now occur at the frequency $f_9$ where the diagonal branch resonates, and the peak will be located at the frequency $f_{10}$, where the curves cross. A typical attenuation characteristic is shown in Fig. 18.

The network of Fig. 13 can be converted into a band-elimination filter by the addition of an inductance $L_3$ in the shunt arm of the T, as shown in Fig. 19. The crystal $X_4$ provides the series arms of the T and the capacitors $C_8$, $C_8$ furnish the shunt capacitances. The bridging branch consists of the inductance $L_2$ and the capacitance $C_7$ connected in parallel. The equivalent lattice is shown in Fig. 20 and the reactance characteristics of the two branches are given in Fig. 21. An additional resonance is introduced into the diagonal branch $Z_b$, at the frequency $f_{15}$, and the attenuation band will extend from this frequency to the lower resonance at $f_{11}$. The two anti-resonances are placed at the same frequency, $f_{13}$, and the curves will ordinarily cross at two frequencies, such as $f_{12}$ and $f_{14}$, thus locating the peaks of attenuation as shown by the characteristic of Fig. 22. If the two curves do not cross, the two peaks will coalesce and there will be a single peak located at the frequency of anti-resonance $f_{13}$.

The network of Fig. 19 can be converted to a high-pass filter by arranging the inductance and the capacitance in the bridging branch in series instead of in parallel, as shown in Fig. 23 by the elements $L_4$ and $C_9$. A shunting capacitor, represented by $C_{10}$, is also sometimes required in the bridging branch. The equivalent lattice is shown in Fig. 24 and the reactance characteristics of the branches are given in Fig. 25. A resonance is introduced in the line branch, at the frequency $f_{19}$, and the anti-resonance occurs at $f_{20}$. The anti-resonance of the diagonal branch is made to coincide with the resonance of the line branch, and the upper resonance of the diagonal branch is placed at the anti-resonance of the line branch. The lower resonance of the diagonal branch, occurring at $f_{18}$, determines the cut-off of the filter. The curves can be made to cross at two frequencies, such as $f_{16}$ and $f_{17}$, at which points there will be attenuation peaks. Fig. 26 gives a typical attenuation characteristic.

It is seen that the bridging branch $Z_1$ of the filter of Fig. 23 has the same configuration as the equivalent electrical circuit for a crystal. In certain cases this branch can, therefore, be replaced by a crystal element $X_6$ as shown in Fig. 27. The other elements in Fig. 27 are the same as those in Fig. 23, and the two networks can be designed to have identical attenuation characteristics.

Another form of high-pass filter is shown in Fig. 28 in which the crystal $X_7$ employs reversed poling and is shunted at its ends by the capacitors $C_{13}$ and $C_{13}$. The capacitor $C_{12}$ forms the bridging branch, and the shunt branch is constituted by the capacitor $C_{14}$ and the inductor $L_6$ connected in series. The equivalent lattice is given in Fig. 29 and the reactance characteristics of its branches in Fig. 30. The line branch has a resonance at $f_{23}$, which determines the cut-off, and an anti-resonance at $f_{24}$ which coincides with the resonance of the diagonal branch. The peaks of attenuation occur at the frequencies $f_{21}$ and $f_{22}$ where the two curves cross. The attenuation characteristic is of the same type as that shown in Fig. 26. It will be noted that this high-pass filter requires only one inductor and a single crystal element.

As already pointed out the general impedances $Z_1$ and $Z_2$ of Fig. 1 may have any degree of complexity. It follows, therefore, that one skilled in filter design may devise many other circuits in accordance with the principles of the invention set forth above. The circuits shown and described are to be considered merely as illustrative.

What is claimed is:

1. A wave filter of the bridged-T type having a pair of input terminals and a pair of output terminals, said filter comprising a piezoelectric crystal having two electrodes on one face and two other oppositely disposed electrodes on the opposite face, two of said electrodes being connected directly together and through a common shunt branch to an input terminal and an associated output terminal, and the remaining electrodes being connected respectively to the remaining terminals, and a bridging impedance branch connected between said remaining terminals, the dimensions of said crystal and the values of the reactance elements forming said bridging branch and said shunt branch being proportioned with respect to one another and with respect to two preassigned frequencies to provide a transmission band between said frequencies.

2. A wave filter in accordance with claim 1 in which said bridging branch includes a capacitor.

3. A wave filter of the bridged-T type comprising a symmetrical T network consisting of two equal series arms and an interposed shunt impedance branch connected between a pair of input terminals and a pair of output terminals, and a bridging impedance branch connected between the outer terminals of said series arms, said series arms being constituted by a single piezoelectric crystal having a divided electrode on at least one side, and the dimensions of said crystal and the values of the reactance elements constituting said bridging branch and said shunt branch being proportioned with respect to one another and with respect to two preassigned frequencies to provide a transmission band between said frequencies.

4. A wave filter in accordance with claim 3 in which said shunt branch includes an inductor.

5. A wave filter in accordance with claim 3 in which said bridging branch includes a second piezoelectric crystal.

6. A wave filter in accordance with claim 3 which includes equal capacitors connected in shunt at the ends of said crystal.

7. A wave filter in accordance with claim 3 in which said bridging branch includes a capacitor.

8. A wave filter in accordance with claim 3 in which said bridging branch includes a capacitor and an inductor connected in series and said shunt branch includes a second inductor.

9. A wave filter of the bridged-T type comprising a pair of input terminals, a pair of output terminals, a bridging impedance branch including a capacitor connected between an input terminal and a corresponding output terminal, and a piezoelectric crystal having two electrodes on one face and a third electrode on the opposite face, said two electrodes being connected respectively to the terminals of said bridging branch, said third electrode being connected to the remaining input terminal and output terminal, and the dimensions of said crystal and the values of the reactance elements constituting said bridging branch being proportioned with respect to one another and with respect to two preassigned frequencies to provide a transmission band between said frequencies.

10. A wave filter comprising a pair of input terminals, a pair of output terminals, a bridging impedance branch including a capacitor connected between an input terminal and a corresponding output terminal, and a piezoelectric crystal having two electrodes on one face and two other electrodes on the opposite face, an electrode on one face and an electrode on the opposite face being connected respectively to the terminals of said bridging branch, the remaining electrodes being connected together and to the remaining input terminal and output terminal, and the dimensions of said crystal and the values of the reactance elements constituting said bridging branch being proportioned with respect to one another and with respect to two preassigned frequencies to provide a transmission band between said frequencies.

11. A wave filter having a pair of input terminals and a pair of output terminals, said filter comprising a piezoelectric crystal having two electrodes on one face and two other oppositely disposed electrodes on the opposite face, two of said electrodes on the same face of the crystal being connected together and through a shunt branch to an input terminal and an associated output terminal and the remaining electrodes being connected respectively to the remaining terminals, and a bridging impedance branch connected between said remaining terminals, the dimensions of said crystal and the values of the reactance elements forming said bridging branch and said shunt branch being proportioned with respect to one another and with respect to two preassigned frequencies to provide a transmission band between said frequencies.

12. A wave filter having a pair of input terminals and a pair of output terminals, said filter comprising a piezoelectric crystal having two electrodes on one face and two other oppositely disposed electrodes on the opposite face, two of said electrodes which are diagonally opposite to each other being connected together and through a shunt branch to an input terminal and an associated output terminal and the remaining electrodes being connected respectively to the remaining terminals, and a bridging impedance branch connected between said remaining terminals, the dimensions of said crystal and the values of the reactance elements forming said bridging branch and said shunt branch being proportioned with respect to one another and with respect to two preassigned frequencies to provide a transmission band between said frequencies.

13. A wave filter having a pair of input terminals and a pair of output terminals, said filter comprising a piezoelectric crystal having two electrodes on one face and two other oppositely disposed electrodes on the opposite face, two of said electrodes being connected together and through a shunt branch to an input terminal and an associated output terminal and the remaining electrodes being connected respectively to the remaining terminals, a bridging impedance branch connected between said remaining terminals, and equal reactance elements connected in shunt at the ends of said crystal, the dimensions of said crystal and the values of said equal reactance elements and the reactance elements forming said bridging branch and said shunt branch being proportioned with respect to one another and with respect to two preassigned frequencies to provide a transmission band between said frequencies.

14. A wave filter in accordance with claim 13 in which said equal reactance elements are capacitors.

15. A wave filter having a pair of input terminals and a pair of output terminals, said filter comprising a piezoelectric crystal having two electrodes on one face and two other oppositely disposed electrodes on the opposite face, two of said electrodes being connected together and through a shunt branch to an input terminal and an associated output terminal and the remaining electrodes being connected respectively to the remaining terminals, and a bridging impedance branch including a capacitor and an inductor connected between said remaining terminals, the dimensions of said crystal and the values of the reactance elements forming said bridging branch and said shunt branch being proportioned with respect to one another and with respect to two preassigned frequencies to provide a transmission band between said frequencies.

16. A wave filter in accordance with claim 15 in which said capacitor and inductor are connected in series.

17. A wave filter in accordance with claim 15 in which said capacitor and inductor are connected in parallel.

18. In combination, two wave filters connected in tandem, each of said filters having a pair of input terminals and a pair of output terminals and each of said filters comprising a piezoelectric crystal having two electrodes on one face and two other oppositely disposed electrodes on the opposite face, two of said electrodes being connected together and through a shunt branch to an input terminal and an associated output terminal and the remaining electrodes being connected respectively to the remaining terminals, and a bridging impedance branch connected between said remaining terminals, the dimensions of said crystal and the values of the reactance elements forming said bridging branch and said shunt branch being proportioned with respect to one another and with respect to two preassigned frequencies to provide a transmission band between said frequencies, said filters having the same transmission band, the interconnected electrodes in one of said filters being on the same side of the crystal and the interconnected electrodes in the other of said filters being diagonally opposite to each other.

19. A wave filter comprising a pair of input terminals, a pair of output terminals, a bridging impedance branch including a capacitor connected between an input terminal and a corresponding output terminal, and a piezoelectric crystal having two electrodes on one face and a third electrode on the opposite face, said two electrodes being connected respectively to the terminals of said bridging branch, said third electrode being connected to the remaining input terminal and output terminal, the dimensions of said crystal and the values of the reactance elements constituting said bridging branch being proportioned with respect to one another and with respect to two preassigned frequencies to provide a transmission band between said frequencies and said capacitor being made variable in order to adjust the location of a peak of attenuation in the attenuation characteristics of the filter.

20. A wave filter comprising a pair of input terminals, a pair of output terminals, a bridging impedance branch including a capacitor connected between an input terminal and a corresponding output terminal, a piezoelectric crystal having two electrodes on one face and a third electrode on the opposite face, and two equal capacitors, said two electrodes being connected respectively to the terminals of said bridging branch, said third electrode being connected to the remaining input terminal and output terminal, said equal capacitors being connected in shunt at the ends of said crystal, the dimensions of said crystal and the values of said equal capacitors and the reactance elements constituting said bridging branch being proportioned with respect to one another and with respect to two preassigned frequencies to provide a transmission band between said frequencies, and said equal capacitors being made variable in order to adjust the width of said transmission band.

HENRY G. OCH.